(12) United States Patent
Kodama

(10) Patent No.: US 9,950,746 B2
(45) Date of Patent: Apr. 24, 2018

(54) VEHICLE

(71) Applicant: The Yokohama Rubber Co., LTD., Minato-ku, Tokyo (JP)

(72) Inventor: Yuji Kodama, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/107,898

(22) PCT Filed: Dec. 22, 2014

(86) PCT No.: PCT/JP2014/083977
§ 371 (c)(1),
(2) Date: Jun. 23, 2016

(87) PCT Pub. No.: WO2015/098878
PCT Pub. Date: Jul. 2, 2015

(65) Prior Publication Data
US 2016/0318561 A1   Nov. 3, 2016

(30) Foreign Application Priority Data
Dec. 25, 2013   (JP) .................................. 2013-267874

(51) Int. Cl.
*B62D 25/18* (2006.01)
*B62D 35/02* (2006.01)
(Continued)

(52) U.S. Cl.
CPC .............. *B62D 25/18* (2013.01); *B60C 13/02* (2013.01); *B62D 25/16* (2013.01); *B62D 35/00* (2013.01); *B62D 35/02* (2013.01)

(58) Field of Classification Search
CPC ........ B60C 13/02; B62D 25/16; B62D 25/18; B62D 35/00; B62D 35/02
(Continued)

(56) References Cited

U.S. PATENT DOCUMENTS

2012/0097304 A1 * 4/2012 Kojima ................... B60O 5/00
  152/523
2015/0136292 A1   5/2015 Kodama et al.
2015/0360521 A1   12/2015 Kojima et al.

FOREIGN PATENT DOCUMENTS

JP   S49-0115809   10/1974
JP   S59-0227568   12/1984
(Continued)

OTHER PUBLICATIONS

English translation of JP 5246370; retrieved Aug. 16, 2017 via Japan Platform for Patent Information, located at https://www.j-platpat.inpit.go.jp/web/all/top/BTmTopEnglishPage.*
(Continued)

*Primary Examiner* — Jason S Daniels
(74) *Attorney, Agent, or Firm* — Thorpe North & Western

(57) ABSTRACT

A vehicle is provided with wheels fitted with pneumatic tires, and a vehicle body including wheel wells that surround the wheels. The pneumatic tire includes a plurality of protrusions on a sidewall portion that faces a predetermined wheel well side surface. An average normal vector of the wheel well side surface is inclined with respect to a rotation axis of the wheel. In such a configuration, when the vehicle is traveling and the tires are rotating, an air flow promotion effect and rectification effect are produced due to the protrusions on the sidewall portion, and negative pressure forms between the tire and the wheel well side surface.

17 Claims, 15 Drawing Sheets

B-CROSS-SECTIONAL VIEW

(51) Int. Cl.
*B60C 13/02* (2006.01)
*B62D 25/16* (2006.01)
*B62D 35/00* (2006.01)

(58) Field of Classification Search
USPC .............................................. 296/181.5, 198
See application file for complete search history.

(56) References Cited

FOREIGN PATENT DOCUMENTS

| | | |
|---|---|---|
| JP | H05-028787 | 4/1993 |
| JP | 2003-137140 | 5/2003 |
| JP | 5246370 | 7/2013 |
| JP | 5251709 | 7/2013 |
| WO | WO 2014/030391 | 2/2014 |

OTHER PUBLICATIONS

International Search Report for International Application No. PCT/JP2014/083977 dated Mar. 25, 2015, 4 pages, Japan.

* cited by examiner

A-CROSS-SECTIONAL VIEW

B-CROSS-SECTIONAL VIEW

| | CONVENTIONAL EXAMPLE 1 | CONVENTIONAL EXAMPLE 2 | WORKING EXAMPLE 1 | WORKING EXAMPLE 2 | WORKING EXAMPLE 3 | WORKING EXAMPLE 4 | WORKING EXAMPLE 5 | WORKING EXAMPLE 6 | WORKING EXAMPLE 7 | WORKING EXAMPLE 8 | WORKING EXAMPLE 9 | WORKING EXAMPLE 10 |
|---|---|---|---|---|---|---|---|---|---|---|---|---|
| PROTRUSIONS LOCATED INWARD IN VEHICLE BODY DIRECTION | - | ○ | ○ | ○ | ○ | ○ | ○ | ○ | ○ | ○ | ○ | ○ |
| RECESSES LOCATED OUTWARD IN THE VEHICLE BODY DIRECTION | - | - | - | - | - | - | - | - | - | - | - | ○ |
| INCLINATION ANGLE θ OF AVERAGE NORMAL VECTOR V (DEGREES) | θ = 0 | θ = 0 | ROAD SURFACE DIRECTION: θ = 1.5 | ROAD SURFACE DIRECTION: θ = 3 | θ = 0 | θ = 0 | ROAD SURFACE DIRECTION: θ = 3 | ROAD SURFACE DIRECTION: θ = 10 | ROAD SURFACE DIRECTION: θ = 10 | ROAD SURFACE DIRECTION: θ = 10 | ROAD SURFACE DIRECTION: θ = 10 | ROAD SURFACE DIRECTION: θ = 10 |
| INCLINATION ANGLE φ OF AVERAGE NORMAL VECTOR V (DEGREES) | φ = 0 | φ = 0 | φ = 0 | φ = 0 | VEHICLE FORWARD DIRECTION: φ = 1.5 | VEHICLE FORWARD DIRECTION: φ = 3 | VEHICLE FORWARD DIRECTION: φ = 3 | VEHICLE FORWARD DIRECTION: φ = 3 | VEHICLE FORWARD DIRECTION: φ = 10 | VEHICLE FORWARD DIRECTION: φ = 10 | VEHICLE FORWARD DIRECTION: φ = 10 | VEHICLE FORWARD DIRECTION: φ = 10 |
| Np × Hp/Wp | - | 5 | 5 | 5 | 5 | 5 | 5 | 5 | 5 | 200 | 100 | 100 |
| Nd × Hd/Wd | - | - | - | - | - | - | - | - | - | - | - | 500 |
| AIR RESISTANCE (INDEX) | 100 | 98 | 98 | 98 | 97 | 96 | 96 | 96 | 95 | 96 | 94 | 93 |
| LIFT (INDEX) | 100 | 105 | 102 | 98 | 105 | 105 | 98 | 95 | 95 | 95 | 95 | 95 |

FIG. 15

VEHICLE

TECHNICAL FIELD

The present technology relates to a vehicle, and particularly relates to a vehicle with improved driving performance.

BACKGROUND ART

In recent years, pneumatic tires provided with protrusions on the sidewall portions have been proposed. The protrusions of such a configuration promote and rectify air flow around the tire. As a result, air resistance of the vehicle is reduced, and thus fuel economy is improved. The technology disclosed in Japanese Patent No. 5251709B is a known conventional pneumatic tire that is configured in this manner.

SUMMARY

As a result of research, the present inventor has found that an air flow promotion effect and rectification effect can be applied to improving the driving performance of a vehicle.

The present technology provides a vehicle with improved driving performance.

A vehicle according to the present technology comprises:
a wheel fitted with a pneumatic tire; and
a vehicle body including a wheel well that surrounds the wheel. In such a vehicle,
the pneumatic tire includes a plurality of protrusions on a sidewall portion that faces a wheel well side surface, the wheel well side surface corresponding to a portion of an inner wall of the wheel well located within a region the pneumatic tire is projected in a rotation axis direction of the wheel when a steering angle and a camber angle is 0 degrees; and
an average normal vector of the wheel well side surface is inclined with respect to the rotation axis of the wheel.

When the vehicle according to the present technology is traveling and the tires are rotating, an air flow promotion effect and rectification effect are produced due to the protrusions, and negative pressure forms between the tire and the wheel well side surface. As a result of this negative pressure, the vehicle body is pulled in the direction of the average normal vector of the wheel well side surface. As such, because the average normal vector is inclined with respect to the rotation axis of the wheel, the vehicle body is subject to additional effects. As a result, driving performance of the vehicle can be improved.

BRIEF DESCRIPTION OF DRAWINGS

FIG. 15 is a table showing results of performance testing of pneumatic tires according to embodiments of the present technology.

DETAILED DESCRIPTION

The present technology is described in detail below, with reference to the accompanying drawings. However, the present technology is not limited to the embodiments. In addition, the components of the embodiments include components that are replaceable while maintaining consistency of the technology, and obviously replaceable components. Furthermore, the modified examples described in the embodiments may be freely combined within the scope of obviousness to a person skilled in the art.

Vehicle

Figure 1:
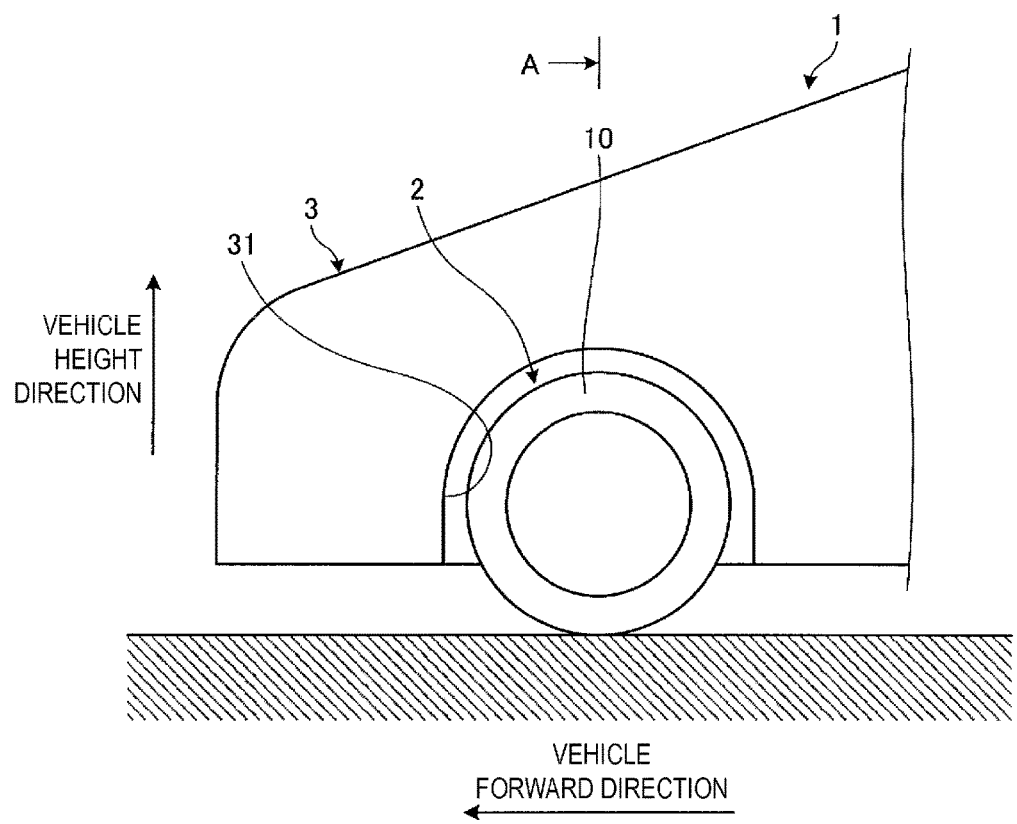
FIG. 1 is a side view illustrating a vehicle according to an embodiment of the present technology.
Figure 2:
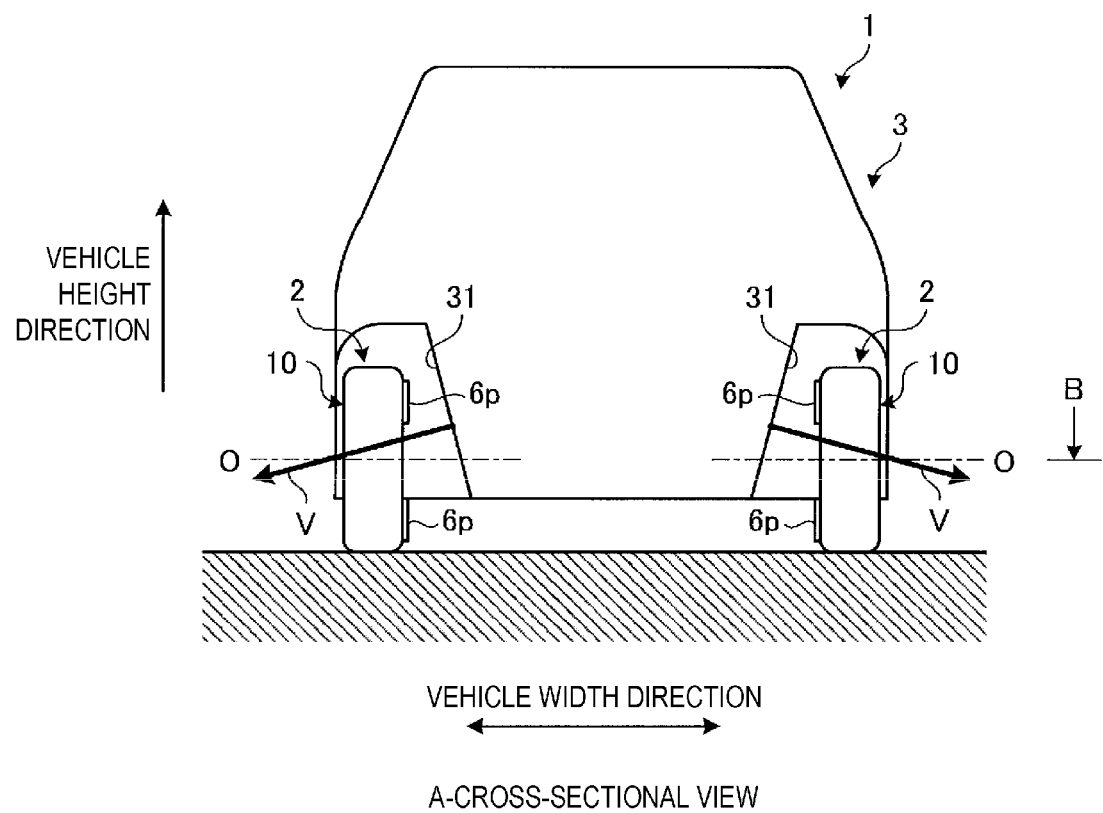
FIG. 2 is a cross-sectional view taken along A illustrating the vehicle illustrated in FIG. 1.
Figure 3:
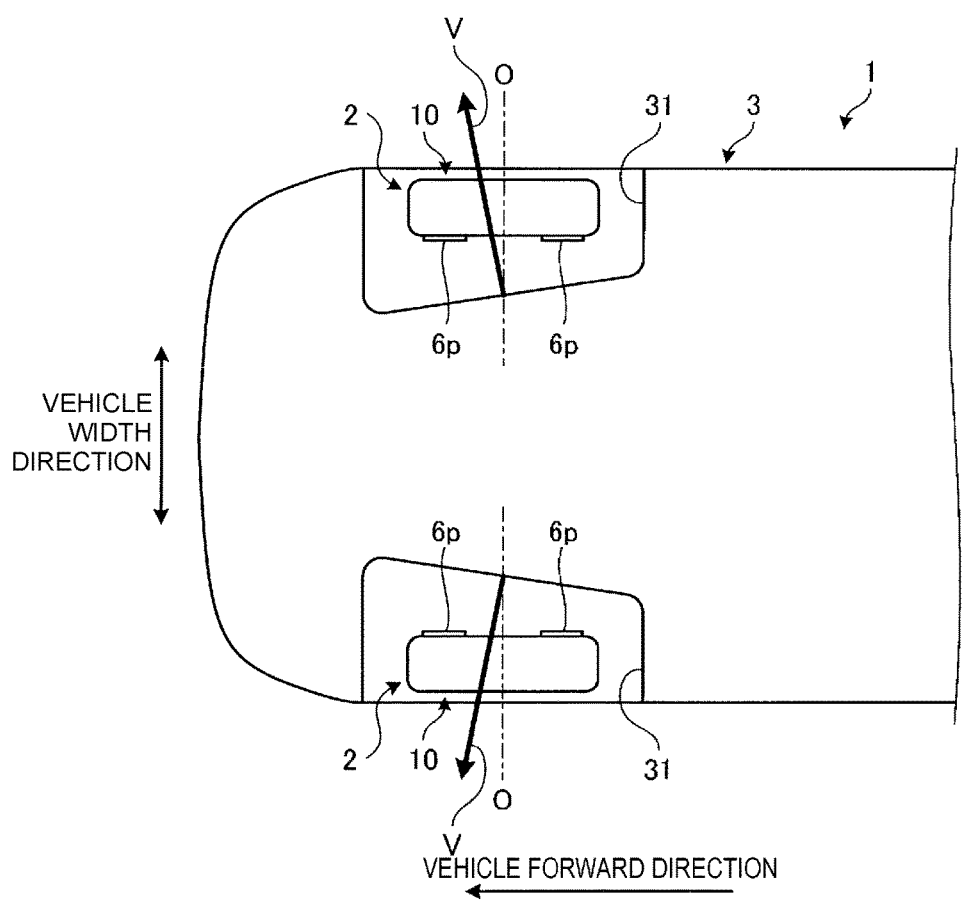
FIG. 3 is a cross-sectional view taken along B illustrating the vehicle illustrated in FIG. 2.

FIG. 1 is a side view illustrating a vehicle according to an embodiment of the present technology. FIG. 2 is a cross-sectional view taken along A illustrating the vehicle illustrated in FIG. 1. FIG. 3 is a cross-sectional view taken along B illustrating the vehicle illustrated in FIG. 2. These diagrams are schematic views of a front portion of a passenger vehicle.

Note that in the embodiments, the term "vehicle forward direction" refers to the direction in which a vehicle 1 advances when driven forward, for example, the direction a vehicle with an automatic transmission advances in when the gearshift is put in "D" position. The term "vehicle width direction" refers to the width direction of the vehicle 1. The term "vehicle height direction" refers to the height direction of the vehicle 1.

The vehicle 1 has application, in particular, to passenger vehicles, trucks, buses, and the like. In addition, the vehicle 1 has application to vehicles provided with wheels on the left and right sides of the vehicle body, and in particular to vehicles provided with four or more wheels. Accordingly, application to two-wheeled vehicles such as motorbikes, for example, is excluded. The vehicle 1 may have a single tire arrangement or a multiple tire arrangement.

As illustrated in FIGS. 1 to 3, the vehicle 1 is provided with left and right wheels 2, 2, and a vehicle body 3. Herein, the front portion of a passenger vehicle is described as an example, however the same configuration can be employed for the rear portion (not illustrated).

The wheel 2 is fitted with a pneumatic tire 10 and is connected to the vehicle body 3 via an axle (not illustrated). In addition, at least the left-right pair of wheels 2, 2 are disposed on the left and right sides of the vehicle 1. In the configuration of FIG. 1 for example, the left-right pair of wheels 2, 2, i.e., the front wheels, are provided at the front portion. As illustrated in FIG. 2 and FIG. 3, the rotation axis O of the left and right wheels 2, 2 are coaxial when the steering angle and camber angle (not illustrated) are at 0 degrees. Note that the wheel 2 may be the steered wheel or the drive wheel.

The vehicle body 3 is the body of the vehicle 1. The vehicle body 3 includes wheel wells 31, 31 that surround the left and right wheels 2, 2.

The wheel well 31 is a portion that accommodates the wheel 2 fitted with the pneumatic tire 10 so as to allow rotation of the wheel 2. The wheel well 31 forms a half closed space surrounding the outer circumference of the pneumatic tire 10. In such a configuration, an inner wall of the wheel well 31 is required to continuously surround a region of the outer circumferential surface of the pneumatic tire 10 from a rim check line LC on one side to a tire equatorial plane CL, when viewed in a cross section taken along the tire meridian direction (see FIG. 5 described below). The inner wall of the wheel well 31 is also required to continuously surround a region of the outer circumferential surface of the pneumatic tire 10 equivalent to 120 degrees in the tire circumferential direction when the sidewall portion is viewed in plan view (see FIG. 4 described below). Note that a fender (not illustrated) for preventing mud splashing up and/or reducing air resistance constitutes a part of the wheel well 31, provided that the fender is integrated with the vehicle body 3 and extends continuously from the wheel well 31.

In the case of the vehicle 1 having a multiple tire arrangement (not illustrated), the wheel well 31 surrounds at least the innermost wheel 2 in the vehicle width direction as described above.

In the configuration of FIG. 1 for example, as illustrated in FIG. 2 and FIG. 3, the vehicle 1 is provided with wheels 2, 2, which are front wheels on the left and right sides of the front portion. In addition, the vehicle body 3 includes wheel wells 31, 31 at positions corresponding with the left and right wheels 2, 2. The wheel well 31 has width in the vehicle width direction sufficient to form a half closed space that surrounds the outer circumference of the wheel 2. Specifically, the wheel well 31 includes the inner wall that continuously surrounds the inner side of the wheel 2 in the vehicle width direction, the upper side of the wheel 2 in the vehicle height direction, and the front and back of the wheel 2 in the vehicle forward direction. The inner wall of the wheel well 31 is disposed with a predetermined clearance from the wheel 2 so that the inner wall does not interfere with the wheel 2 when the tire is rotating or when steering. The inner wall of the wheel well 31 includes an opening (not illustrated) for the axle to pass through located inward of the wheel 2 in the vehicle width direction. The wheel well 31 includes an opening located outward of the wheel 2 in the vehicle width direction and to the lower side in the vehicle height direction. The wheel 2 is exposed from the wheel well 31 via the opening of the wheel well 31 to the outer side in the vehicle width direction. The wheel 2 also protrudes from the opening to the lower side in the vehicle height direction and comes into contact with the road surface.

Pneumatic Tire

Figure 4:
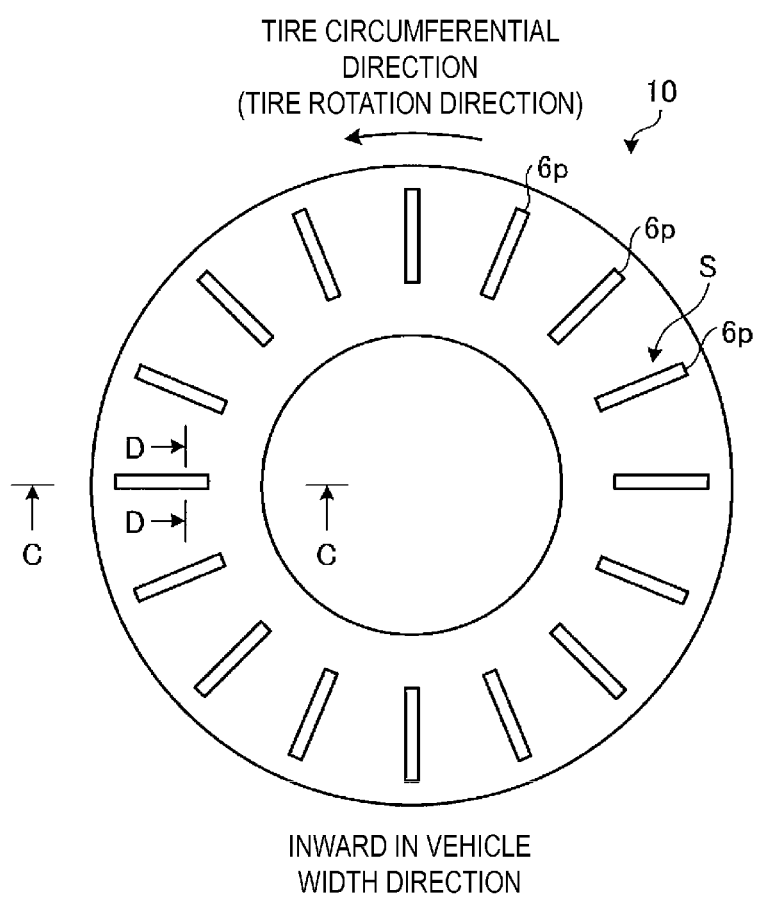
FIG. 4 is a side view illustrating a pneumatic tire of the vehicle illustrated in FIG. 1.
Figure 5:
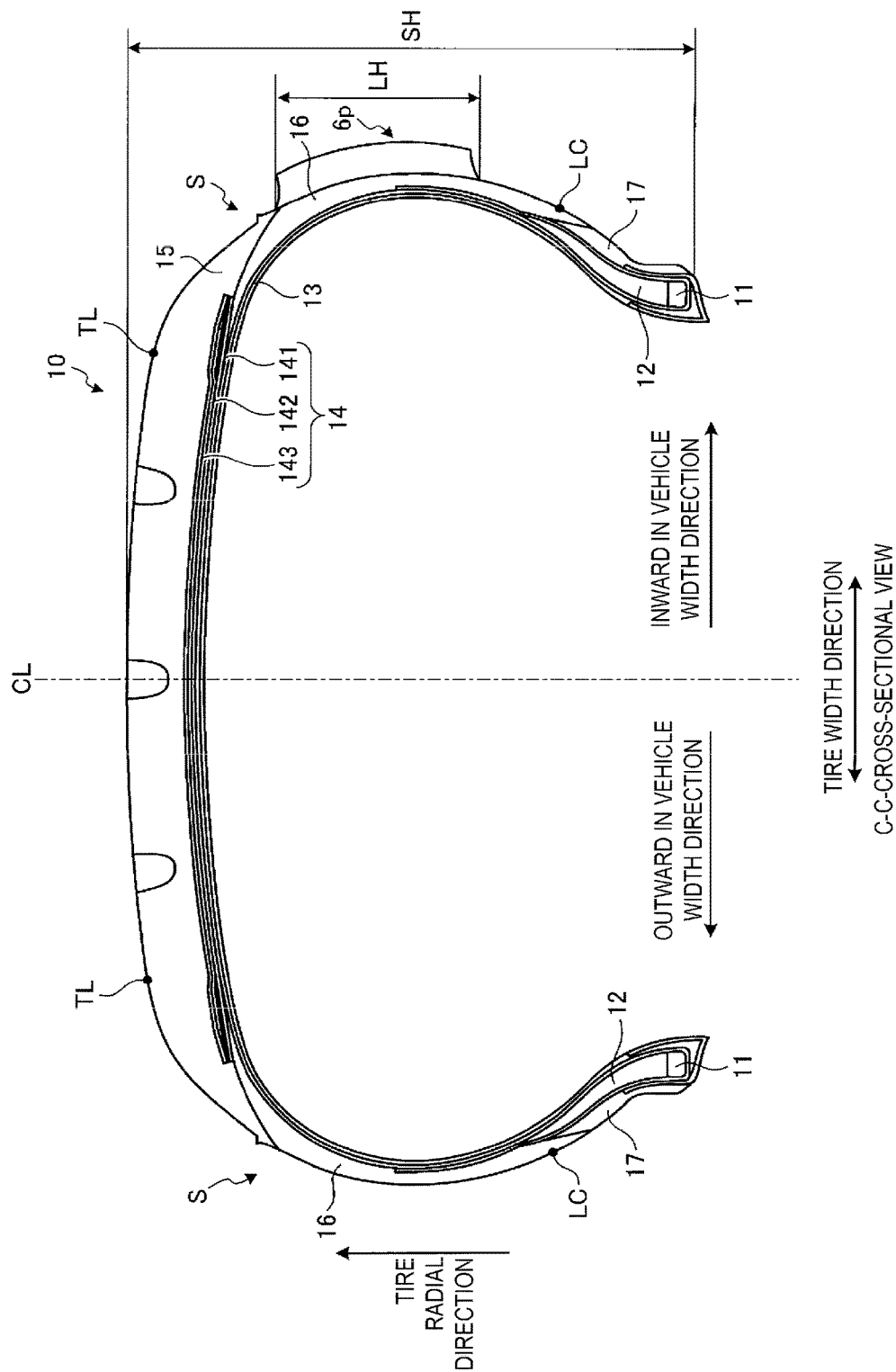
FIG. 5 is a cross-sectional view taken along C-C illustrating the pneumatic tire illustrated in FIG. 4.

FIG. 4 is a side view illustrating the pneumatic tire of the vehicle illustrated in FIG. 1. FIG. 5 is a cross-sectional view taken along C-C illustrating the pneumatic tire illustrated in FIG. 4. FIG. 4 is an overall plan view of the sidewall portion. FIG. 5 is a meridian cross-sectional view of a region of the pneumatic tire 10 to one side in the tire radial direction.

In reference to these drawings, the term "cross section taken along the tire meridian direction" refers to a cross section of the tire taken along a plane that includes the tire rotation axis (not illustrated). The reference sign "CL" denotes the tire equatorial plane and refers to a plane normal to the tire rotation axis that passes through the center point of the tire in the tire rotation axis direction. The term "tire width direction" refers to a direction parallel to the tire rotation axis. The term "tire radial direction" refers to a direction normal to the tire rotation axis.

Note that in the description of the embodiments, a radial tire for a passenger vehicle is used as an example of the pneumatic tire 10. However, the pneumatic tire 10 is not limited thereto, and the configuration of the pneumatic tire 10 can be applied to tires adapted to various kinds of vehicles (vehicle 1) such as tires for racing, tires for trucks and buses, and the like (not illustrated).

The pneumatic tire 10 has an annular structure with the tire rotation axis as its center, and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 5).

The pair of bead cores 11, 11 are annular members constituted by a plurality of bead wires bundled together. The pair of bead cores 11, 11 constitute the cores of the left and right bead portions. The pair of bead fillers 12, 12 are disposed on peripheries of the pair of bead cores 11, 11 in the tire radial direction and constitute the bead portions.

The carcass layer 13 extends between the left and right bead cores 11, 11 in a toroidal form, forming a framework for the tire. Additionally, both ends of the carcass layer 13 are folded toward outer sides in the tire width direction so as to wrap around the bead cores 11 and the bead fillers 12, and fixed. The carcass layer 13 is constituted by a plurality of carcass cords formed from steel or organic fibers (e.g. aramid, nylon, polyester, rayon, or the like) covered by a coating rubber and subjected to a rolling process, and has a carcass angle (inclination angle in the fiber direction of the belt cord with respect to the tire circumferential direction), as an absolute value, of from 80 degrees to 95 degrees, both inclusive.

The belt layer 14 is formed by layering a pair of cross belts 141, 142, and a belt cover 143. The belt layer 14 is disposed on the periphery of the carcass layer 13. The pair of cross belts 141, 142 are constituted by a plurality of belt cords formed from steel or organic fibers, covered by coating rubber, and subjected to a rolling process, having a belt angle, as an absolute value, from 20 degrees to 40 degrees, both inclusive. Furthermore, the pair of cross belts 141 and 142 have belt angles (inclination angle in the fiber direction of the belt cord with respect to the tire circumferential direction) of opposite signs, and the belts are layered so as to intersect each other in the belt cord fiber directions (crossply configuration). The belt cover 143 is constituted by a plurality of belt cords formed from steel or organic fibers, covered by coating rubber, and subjected to a rolling process. The belt cover 143 is disposed substantially parallel (±5 degrees) to the tire circumferential direction. Moreover, the belt cover 143 is layered outward of the cross belts 141, 142 in the tire radial direction.

The tread rubber 15 is disposed on the outer circumference of the carcass layer 13 and the belt layer 14 in the tire radial direction, and constitutes a tread portion. The pair of sidewall rubbers 16, 16 are disposed outward of the carcass layer 13 in the tire width direction. The sidewall rubbers 16, 16 constitute sidewall portions on the left and right sides. The pair of rim cushion rubbers 17, 17 are disposed inward of the left and right bead cores 11, 11 and the folded back portion of the carcass layer 13 in the tire radial direction. The pair of rim cushion rubbers 17, 17 constitute the contact surfaces of the left and right bead portions with the rim flanges.

Tire Side Portion

Here, a region from a tire ground contact edge TL to the rim check line LC is referred to as the tire side portion S (see FIG. 5). The tire side portion S includes the sidewall portion, a portion of the shoulder portion, and a portion of the bead portion of the tire.

The term "tire ground contact edge TL" refers to the maximum width position in a tire axial direction of the contact surface between the tire and a flat plate when the tire is assembled on a specified rim, inflated to a specified internal pressure, placed perpendicular to the flat plate in a static state, and loaded with a load corresponding to a specified load.

The term "rim check line LC" refers to a line used to confirm whether the tire has been assembled on the rim correctly, and, typically, is indicated on a front side surface of the bead portions.

Herein, the term "specified rim" refers to an "applicable rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). In addition, the term "specified internal pressure" refers to "maximum air pressure" defined by JATMA, to a maximum value in "TIRE LOAD LIMITS AT VARIOUS COLD INFLATION PRESSURES" defined by TRA, and to "INFLATION PRESSURES" defined by ETRTO. Also, the term "specified load" refers to a "maximum load capacity" defined by JATMA, to a maximum value in "TIRE LOAD LIMITS AT VARIOUS COLD INFLATION PRESSURES" defined by TRA, and to a "LOAD CAPACITY" defined by ETRTO. However, according to JATMA, for a passenger vehicle tire, the specified internal pressure is an air pressure of 180 kPa, and a specified load is 88% of maximum load capacity.

Tire Side Portion Protrusions

Figure 6:
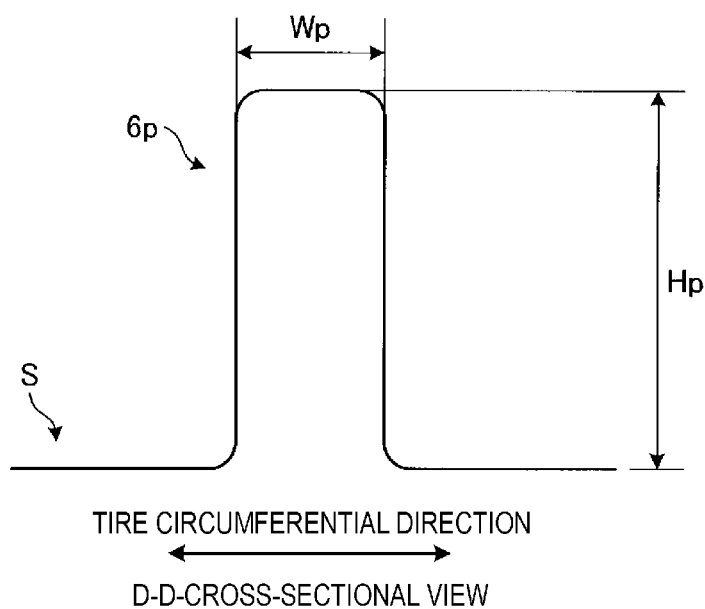
FIG. 6 is a cross-sectional view taken along D-D illustrating the pneumatic tire illustrated in FIG. 4.

FIG. 6 is a cross-sectional view taken along D-D of the pneumatic tire illustrated in FIG. 4. FIG. 6 is an enlarged cross-sectional view of a protrusion 6p disposed on the tire side portion S.

As illustrated in FIG. 4 and FIG. 5, the pneumatic tire 10 is provided with a plurality of protrusions 6p on the surface of the tire side portion S. The protrusions 6p protrude from a reference surface of the tire side portion S. The protrusions 6p have the effect of promoting and rectifying air flow around the tire when the tire is rotating. Otherwise, the protrusions 6p may have the effect of causing turbulent flow at the surface of the tire side portion S when the tire is rotating.

The term "reference surface of the tire side portion S" refers to a surface of the tire side portion S excluding patterns, letters, recessed and protruding portions, and the like, that is used for measurement of a tire cross-sectional width as defined by JATMA.

The protrusion 6p has a long shape in the tire radial direction when the tire side portion S is viewed in plan view. The planar form of the protrusion 6p is not particularly limited in shape as long as the shape is long in the tire radial direction. For example, a planar form of the protrusion 6p may be a rectangle (see FIG. 4), or a bent shape such as a V shape, a circular arc, an S shape, a wave-like shape, and the like (not illustrated). The protrusion 6p can be considered to have a shape long in the tire radial direction only when the longitudinal direction of the protrusion 6p and the tire radial direction make an angle of 45 degrees or less.

The cross-sectional shape of the protrusion 6p, when viewed in a cross-section perpendicular to the longitudinal direction of the protrusion 6p, may have any shape. For example, the cross-sectional shape of the protrusion 6p may be a rectangle (see FIG. 6), a triangle, a hemispherical shape (not illustrated), or the like. In addition, giving the protrusion 6p radiused edges facilitates vulcanization molding of the protrusion 6p.

The plurality of protrusions 6p are arranged on the tire side portion S at predetermined intervals around the tire circumferential direction. As such, the plurality of protrusions 6p are arranged radially about the tire rotation axis.

The protrusions 6p and the tire side portion S are formed integrally via tire vulcanization-molding with a tire molding die. The protrusions 6p are disposed at least on the tire side portion S, of the left and right tire side portions S, S, located inward in the vehicle width direction (see FIG. 2 and FIG. 3).

The length LH of the protrusion 6p in the tire radial direction (see FIG. 5) and the cross-sectional height SH of the tire preferably have the relationship: $0.10 \leq LH/SH$. By satisfying this relationship, the length LH of the protrusion 6p in the tire radial direction is made appropriate, and an air flow promotion effect and rectification effect due to the protrusions 6p when the tire is rotating is improved. The upper limit of LH/SH is not particularly limited to any value but it is subject to restrictions in relation to the tire weight.

The length LH of the protrusion 6p is measured with reference to the portions of the protrusion 6p that are raised in relation to the reference surface of the tire side portion S.

The cross-sectional height SH of the tire is half of the difference between the tire external diameter and the rim diameter and is measured when the tire is assembled on a specified rim, inflated to the specified internal pressure, and in an unloaded state.

The height Hp of the protrusion 6p (see FIG. 6) is preferably in the range: $1 \text{ mm} \leq Hp \leq 10 \text{ mm}$. By the height Hp being in this range, an air flow promotion effect and rectification effect due to the protrusions 6p are ensured, and an increase in air resistance due to the protrusions 6p is suppressed thus suppressing any deterioration in the tire rolling resistance.

The height Hp of the protrusion 6p is taken as the maximum value of the distance from the reference surface of the tire side portion S to the top surface of the protrusion 6p.

The width Wp of the protrusion 6p (see FIG. 6) is preferably in the range: $0.5 \text{ mm} \leq Wp \leq 5 \text{ mm}$. By the width Wp being in this range, the strength of the protrusions 6p is ensured, and an increase in weight due to the protrusions 6p is suppressed thus suppressing any deterioration in the tire rolling resistance.

The width Wp of the protrusion 6p is taken as the maximum value of the distance between the left and right side surfaces when viewed in a cross-section perpendicular to the longitudinal direction of the protrusion 6p.

The number Np of protrusions 6p is preferably in the range: $10 \leq Np \leq 50$. By the number Np being in this range, an air flow promotion effect and rectification effect due to the protrusions 6p are ensured, and an increase in weight due to the protrusions 6p is suppressed thus suppressing any deterioration in the tire rolling resistance.

The number Np of protrusions 6p is taken as the maximum value of the number of protrusions 6p arranged around the tire circumferential direction at a discretionary radial direction position.

In addition, the height Hp, the width Wp, and the number Np of the protrusions 6p preferably have the relationship: 5≤Np×Hp/Wp≤200. By satisfying this relationship, an air flow promotion effect and rectification effect due to the protrusion 6p are appropriately and effectively improved.

Wheel Well Inner Wall Structure

Figure 7:
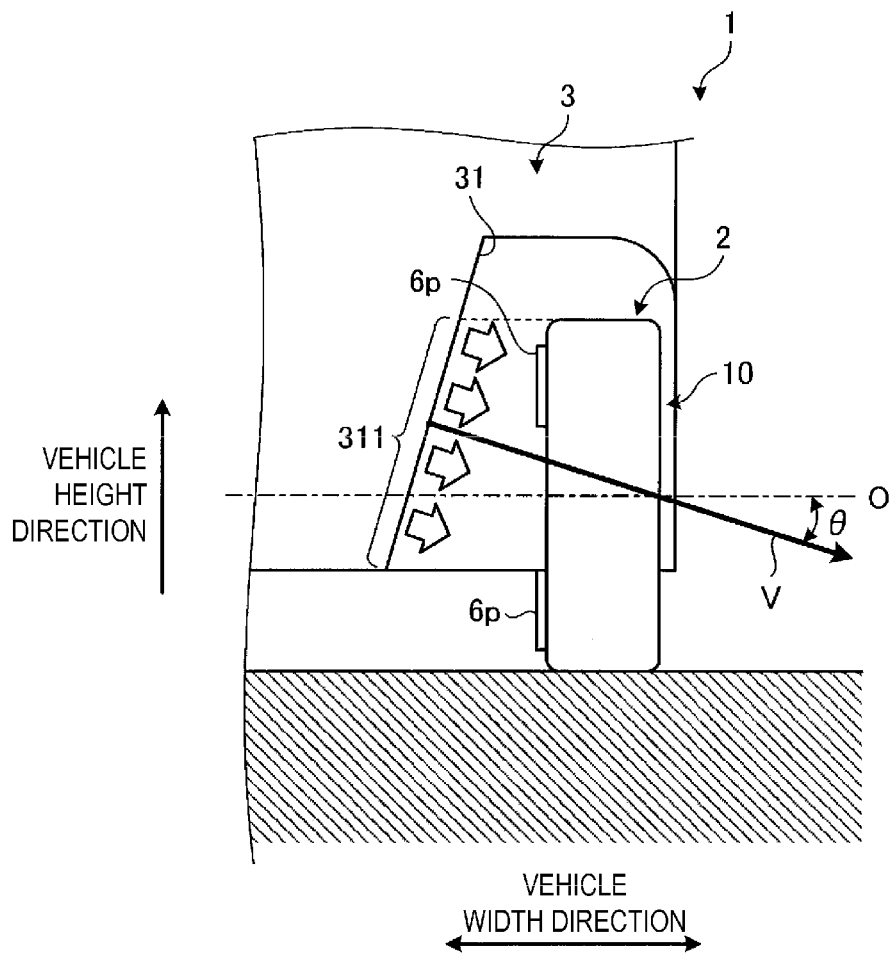
FIG. 7 is an explanatory view illustrating a wheel well of the vehicle illustrated in FIG. 1.
Figure 8:
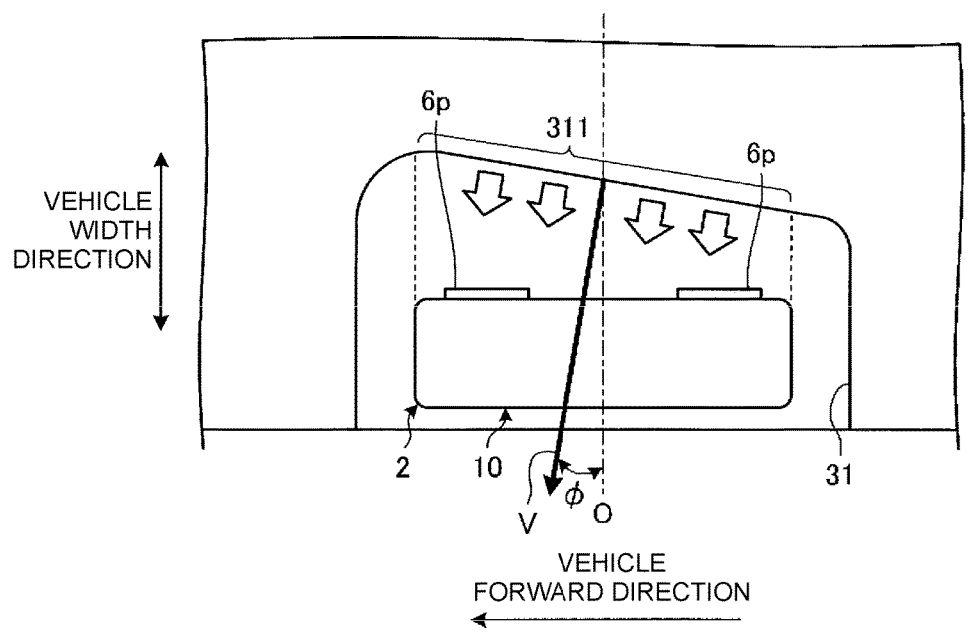
FIG. 8 is an explanatory view illustrating the wheel well of the vehicle illustrated in FIG. 1.

FIG. 7 and FIG. 8 are explanatory views illustrating the wheel well of the vehicle illustrated in FIG. 1. FIG. 7 is an enlarged view of the wheel well 31 viewed in a cross-section taken along both the vehicle width direction and vehicle height direction. FIG. 8 is an enlarged view of the wheel well 31 viewed in a cross-section taken along both the vehicle forward direction and the vehicle width direction. The one dot chain line O in the drawings indicates the rotation axis of the wheel 2 when the steering angle and camber angle is 0 degrees.

As described above, the vehicle 1 is provided with the wheels 2 fitted with the pneumatic tires 10, and the vehicle body 3 including the wheel wells 31 that surround the wheels 2 (see FIGS. 1 to 3). The pneumatic tire 10 includes the plurality of protrusions 6p on the sidewall portion (see FIGS. 4 to 6). The protrusions 6p of such a configuration promote and rectify the flow of air around the tire when the tire is rotating to reduce air resistance of the vehicle 1, thereby improving fuel economy of the vehicle 1.

The portion of the inner wall of the wheel well 31 located within the region the pneumatic tire 10 is projected in the rotation axis O direction of the wheel 2 when the steering angle and the camber angle is 0 degrees (see FIG. 7 and FIG. 8) is referred to as the wheel well side surface 311. The wheel well side surface 311 is the portion of the inner wall of the wheel well 31 that faces the sidewall portion of the pneumatic tire 10.

In the configuration illustrated in FIG. 7 and FIG. 8, the wheel well 31 includes the inner wall located inward of the wheel 2 in the vehicle width direction. Thus, the wheel well side surface 311 is formed inward of the wheel 2 in the vehicle width direction. Note that in the case in which the wheel well 31 includes an opening (not illustrated) for the axle to pass through, the opening does not constitute the wheel well side surface 311 due to not being a wall. In addition, in the case in which the vehicle 1 has a multiple tire arrangement, the above-described wheel well side surface 311 is defined on the basis of the relationship between the pneumatic tire 10 of the innermost wheel 2 in the vehicle width direction and the inner wall of the wheel well 31.

As illustrated in FIG. 7 and FIG. 8, the average normal vector V of the wheel well side surface 311 is inclined with respect to the rotation axis O of the wheel 2.

The average normal vector V of the wheel well side surface 311 is obtained by taking the average value of the normal vectors of the entire region of the wheel well side surface 311. In the case in which the wheel well side surface 311 has a wall-like shape with curves and undulations, for example, the average normal vector V may be approximated by taking the average value of the normal vectors taken at three or more representative positions on the wheel well side surface 311.

When the vehicle 1 is traveling and the tires are rotating, an air flow promotion effect and rectification effect are produced due to the protrusions 6p, and negative pressure forms between the tire 10 and the wheel well side surface 311. As a result of this negative pressure, the vehicle body 3 is pulled in the direction of the average normal vector V of the wheel well side surface 311. As such, because the average normal vector V is inclined with respect to the rotation axis O of the wheel 2, the vehicle body 3 is subject to additional effects. As a result, driving performance of the vehicle 1 can be improved.

For example, in the configuration illustrated in FIG. 7, the average normal vector V of the wheel well side surface 311 is inclined in the road surface direction (downward in the vehicle height direction) with respect to the rotation axis O of the wheel 2. Consequently, the negative pressure between the tire 10 and the wheel well side surface 311 causes the vehicle body 3 to be pulled toward the road surface. As such, downforce is created, thereby suppressing lift of the vehicle 1. This effect, for example, may contribute to a reduction in the air resistance of the vehicle 1, and an improvement in the steering stability performance of the vehicle 1.

In the configuration illustrated in FIG. 7, the inclination angle θ of the average normal vector V is preferably in the range: 3 degrees≤θ≤45 degrees, and more preferably in the range: 5 degrees≤θ≤30 degrees. An inclination angle θ in this range effectively suppresses lift of the vehicle 1.

In addition, in the configuration illustrated in FIG. 8 for example, the average normal vector V of the wheel well side surface 311 is inclined in the vehicle forward direction with respect to the rotation axis O of the wheel 2. Consequently, the negative pressure between the tire 10 and the wheel well side surface 311 causes the vehicle body 3 to be pulled forward. This effect, for example, contributes to a reduction in the air resistance of the vehicle 1.

In the configuration illustrated in FIG. 8, the inclination angle φ in the vehicle forward direction of the average normal vector V is preferably in the range: 3 degrees≤φ≤45 degrees, and more preferably in the range: 5 degrees≤φ≤30 degrees. An inclination angle φ in this range effectively reduces the air resistance of the vehicle 1.

In addition, as illustrated in FIGS. 1 to 3, the vehicle 1 has a configuration combining those illustrated in FIG. 7 and FIG. 8. In other words, the average normal vector V of the wheel well side surface 311 is inclined both in the road surface direction and the vehicle forward direction with respect to the rotation axis O of the wheel 2. Consequently, the steering stability performance of the vehicle 1 can be improved and the air resistance of the vehicle 1 can be reduced. In particular, such a configuration is preferable because with a simple configuration both steering stability performance and air resistance can be adjusted by setting the incline of the wheel well side surface 311 in a predetermined direction.

Note that in the configuration illustrated in FIG. 7 and FIG. 8, because the average normal vector V of the wheel well side surface 311 is directed outward in the vehicle width direction, negative pressure between the tire 10 and the wheel well side surface 311 causes the vehicle body 3 to be pulled outward in the vehicle width direction. When the vehicle 1 is pulled as such, because the left and right wheel wells 31, 31 of the vehicle 1 have a left-right symmetrical configuration as illustrated in FIG. 2 and FIG. 3, the outward pulling forces in the vehicle width direction at the left and right wheel well side surfaces 311, 311 counteract one another.

Note that the smaller the distance from the wheel well side surface 311 to the sidewall portion of the pneumatic tire 10, the more efficient the obtained effect of the negative pressure is. However, clearance needed for rotation and steering of the wheel 2 is required to be appropriately ensured. Thus, the distance from the wheel well side surface 311 to the sidewall portion of the pneumatic tire 10 is preferably adjusted as appropriate in regard to such considerations.

MODIFIED EXAMPLES

Figure 9:
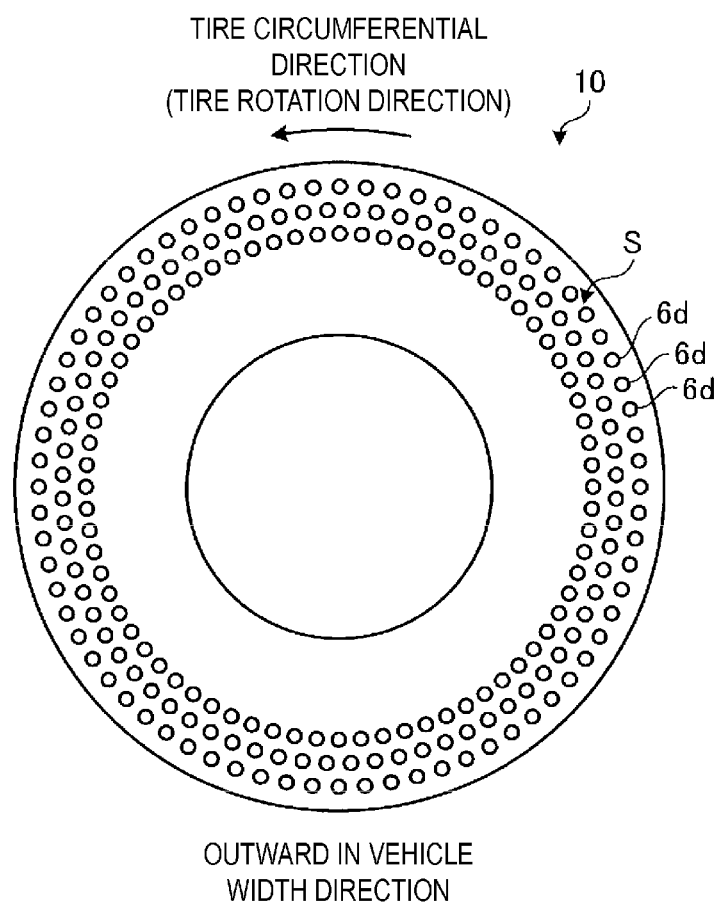
FIG. 9 is an explanatory view of a modified example of the vehicle illustrated in FIG. 1.
Figure 10:
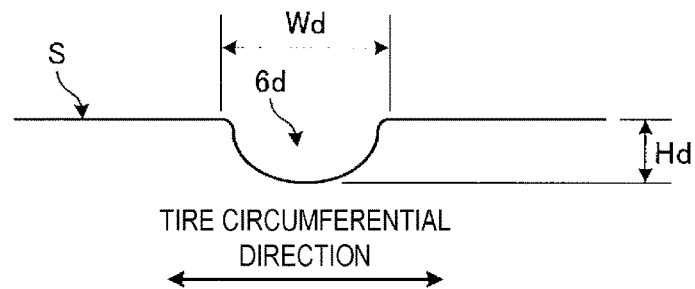
FIG. 10 is an explanatory view of a modified example of the vehicle illustrated in FIG. 1.

FIG. 9 and FIG. 10 are explanatory views of modified examples of the vehicle illustrated in FIG. 1. FIG. 9 is a plan view of the sidewall portion of the pneumatic tire 10 located outward in the vehicle width direction. FIG. 10 is a cross-sectional view of a recess 6*d* of the pneumatic tire 10 illustrated in FIG. 9.

In the configuration illustrated in FIG. 4 and FIG. 5, the pneumatic tire 10 is provided with the plurality of protrusions 6*p* on the sidewall portion located inward in the vehicle width direction.

Additionally, the pneumatic tire 10 having the configuration illustrated in FIG. 4 and FIG. 5 is preferably provided with a plurality of the recesses 6*d* on the sidewall portion located outward in the vehicle width direction. In other words, the pneumatic tire 10 is provided with the plurality of protrusions 6*p* on the sidewall portion located inward in the vehicle width direction, and the plurality of recessed 6*d* on the sidewall portion located outward in the vehicle width direction. In the configuration illustrated in FIG. 9 for example, the plurality of recesses 6*d* are disposed on the tire side portion S of the pneumatic tire 10. These recesses 6*d* are spaced at predetermined intervals in a grid-like arrangement.

The recesses 6*d* recess from the reference surface of the tire side portion S. The recesses 6*d* have the effect of promoting and rectifying air flow around the tire when the tire is rotating. The recesses 6*d* may also cause turbulent flow at the surface of the tire side portion S when the tire is rotating.

The recesses 6*d* are not particularly limited to any shape, and, for example, may be any shape such as a hemispherical shape (see FIG. 9 and FIG. 10), a cone, a pyramid, a column-shape, a prism, and the like (not illustrated).

The depth Hd of the recess 6*d* (see FIG. 10) is preferably in the range: 0.3 mm≤Hd≤2 mm. By the depth Hd being in this range, an air flow promotion effect and rectification effect due to the recesses 6*d* are ensured, and an increase in air resistance due to the recesses 6*d* is suppressed, thus suppressing any deterioration in tire rolling resistance.

The depth Hd of the recess 6*d* is taken as the distance from the reference surface of the tire side portion S to the position of maximum depth of the recess 6*d*.

The size Wd (see FIG. 10) of the recess 6*d* is preferably in the range: 0.5 mm≤Wd≤10 mm. By the size Wd being in this range, an air flow promotion effect and rectification effect due to the recesses 6*d* are ensured, and an increase in air resistance due to the recesses 6*d* is suppressed, thus suppressing any deterioration in tire rolling resistance.

The size Wd of the recess 6*d* is taken as the maximum diameter (diameter dimension) of the opening of the recesses 6*d*.

The number Nd of recesses 6*d* is preferably in the range: 50≤Nd≤300. By the number Nd being in this range, an air flow promotion effect and rectification effect due to the recesses 6*d* are ensured, and an increase in air resistance due to the recesses 6*d* is suppressed, thus suppressing any deterioration in tire rolling resistance.

The number Nd of recesses 6*d* is taken as the maximum value of the number of recesses 6*d* arranged around the tire circumferential direction at a discretionary radial direction position.

In addition, the depth Hd, the size Wd, and the number Nd of the recesses 6*d* preferably have the relationship: 5≤Nd× Hd/Wd≤100000. By satisfying this relationship, an air flow promotion effect and rectification effect due to the recesses 6*d* is effectively improved.

Figure 11:
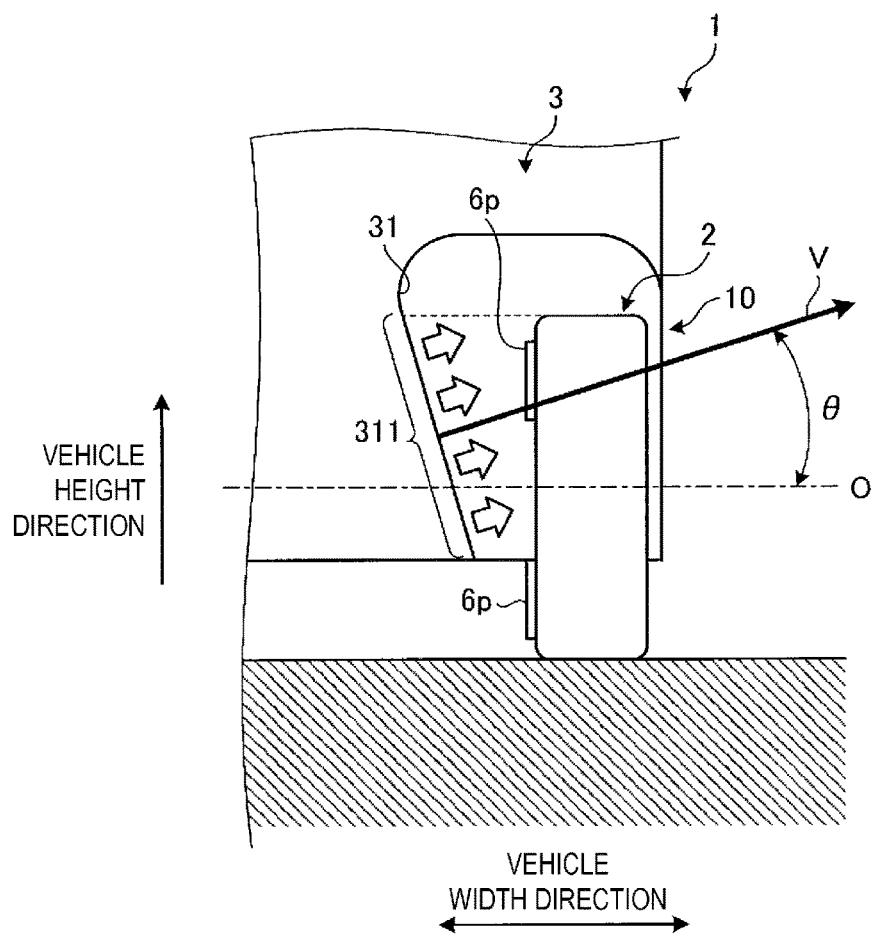
FIG. 11 is an explanatory view of a modified example of the vehicle illustrated in FIG. 1.
Figure 12:
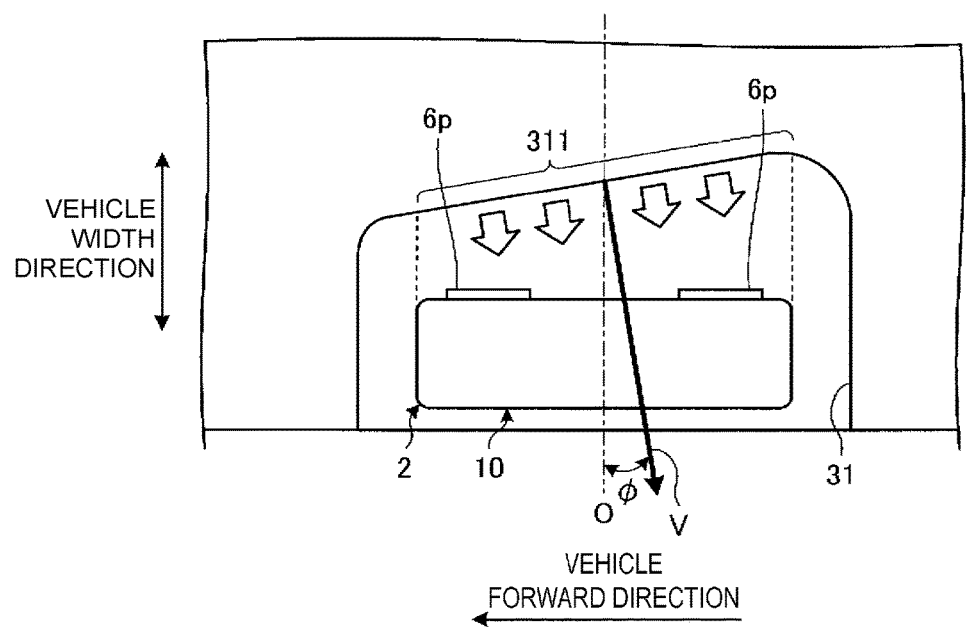
FIG. 12 is an explanatory view of a modified example of the vehicle illustrated in FIG. 1.

FIG. 11 and FIG. 12 are explanatory views of modified examples of the vehicle illustrated in FIG. 1. FIG. 11 is an enlarged view of the wheel well 31 viewed in a cross-section taken along both the vehicle width direction and vehicle height direction. FIG. 12 is an enlarged view of the wheel well 31 viewed in a cross-section taken along both the vehicle forward direction and the vehicle width direction. The one dot chain line O in the drawings indicates the rotation axis of the wheel 2 when the steering angle and camber angle is 0 degrees.

As described above, in the configuration illustrated in FIG. 7, the average normal vector V of the wheel well side surface 311 is inclined in the road surface direction (downward in the vehicle height direction) with respect to the rotation axis O of the wheel 2. In such a configuration, downforce is applied to the vehicle 1, thereby suppressing lift of the vehicle 1.

In contrast, in the configuration illustrated in FIG. 11, the average normal vector V of the wheel well side surface 311 is inclined in the vehicle height direction (toward the ceiling of the vehicle 1) with respect to the rotation axis O of the wheel 2. In such a configuration, the negative pressure between the tire 10 and the wheel well side surface 311 causes the vehicle body 3 to be pulled in the vehicle height direction. As a result, for example, the load acting upon the tire is reduced, and thus rolling resistance is reduced.

As described above, in the configuration illustrated in FIG. 8, the average normal vector V of the wheel well side surface 311 is inclined in the vehicle forward direction with respect to the rotation axis O of the wheel 2. In such a configuration, the vehicle body 3 is pulled forward, and thus the air resistance of the vehicle 1 is reduced.

In contrast, in the configuration illustrated in FIG. 12, the average normal vector V of the wheel well side surface 311 is inclined in the direction opposite the vehicle forward direction (in the vehicle backward direction) with respect to the rotation axis O of the wheel 2. In such a configuration, the negative pressure between the tire 10 and the wheel well side surface 311 causes the vehicle body 3 to be pulled in the direction opposite the vehicle forward direction. As a result, for example, the braking ability of the vehicle 1 is improved.

As described above, various and additional effects are obtained by inclining the average normal vector V of the wheel well side surface 311 with respect to the rotation axis O of the wheel 2. As a result, the driving performance of the vehicle 1 can be improved in a multifaceted manner.

As described above, in the configuration illustrated in FIG. 1, a configuration combining those illustrated in FIG. 7 and FIG. 8 is used. Specifically, the average normal vector V of the wheel well side surface 311 is inclined both in the road surface direction and the vehicle forward direction with respect to the rotation axis O of the wheel 2.

However, the combinations are not limited thereto, and a configuration combining those of FIG. 7 and FIG. 11, a configuration combining those of FIG. 8 and FIG. 12 may be freely selected. For example, any combinations including: (1) a configuration combining those of FIG. 7 and FIG. 8, (2) a configuration combining those of FIG. 7 and FIG. 12, (3) a configuration combining those of FIG. 11 and FIG. 8, and (4) a configuration combining those of FIG. 11 and FIG. 12 can be employed. Consequently, various and additional effects are obtained, and thus the driving performance of the vehicle 1 can be improved in a multifaceted manner.

Figure 13:
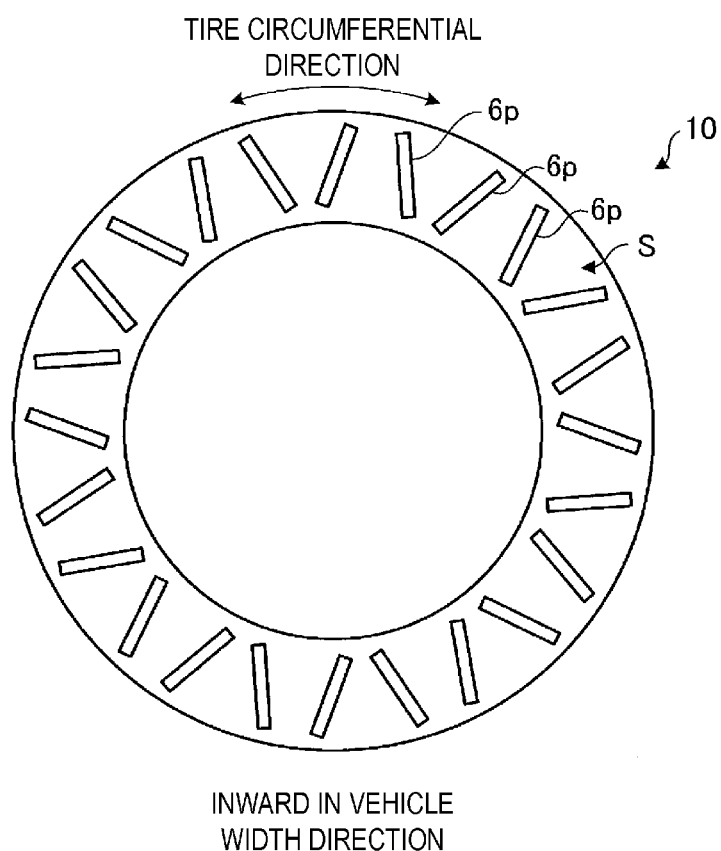
FIG. 13 is an explanatory view of a modified example of the vehicle illustrated in FIG. 1.
Figure 14:
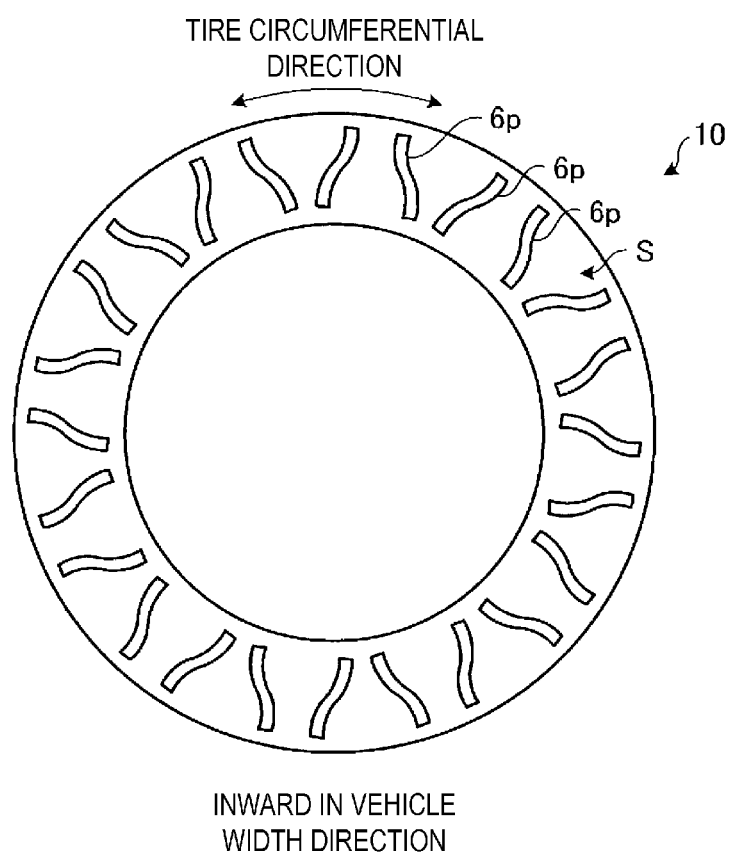
FIG. 14 is an explanatory view of a modified example of the vehicle illustrated in FIG. 1.

FIG. 13 and FIG. 14 are explanatory views of modified examples of the pneumatic tire illustrated in FIG. 4. FIG. 13 and FIG. 14 are plan views of the sidewall portion of the pneumatic tire 10 located inward in the vehicle width direction.

In the configuration illustrated in FIG. 4, the pneumatic tire 10 is provided with the plurality of linear shaped protrusions 6p disposed on the tire side portion S. These protrusions 6p are arranged with their longitudinal directions parallel to the tire radial direction.

However, the protrusions 6p are not limited to such a shape and arrangement and may have any shape or arrangement as long as the air flow promotion effect and the rectification effect, or the turbulent flow generation effect is obtained.

As illustrated in FIG. 13 for example, when the sidewall portion is viewed in plan view, the plurality of protrusions 6p may have a linear shape and be arranged with the longitudinal direction of the protrusions 6p inclined with respect to the tire radial direction. Adjacent protrusions 6p of such a configuration may incline in different directions (see FIG. 13) or may incline in the same direction (not illustrated). In addition, each of the protrusions 6p may be inclined at the same angle or having different angles of inclination.

Additionally, for example, when the sidewall portion is viewed in plan view, the plurality of protrusions 6p may have a curved shape such as a circular arcuate shape, an S-shape, or the like (see FIG. 14), or may have a bent shape such as a V-shape, an N-shape, a W-shape, or the like (not illustrated). Adjacent protrusions 6p may curve/bend in a direction different from one another (see FIG. 14), or may curve/bend in the same direction from one another (not illustrated). The curvature/angle of bend of the protrusions 6p when the sidewall portion is viewed in plan view can be optimized based on the relationship with the air flow promotion effect and the rectification effect, or the turbulent flow generation effect of the protrusions 6p.

The protrusions 6p of the configurations illustrated in FIG. 4, FIG. 13, and FIG. 14 have a long structure continuously extending in the tire radial direction and are disposed in the entire region of the tire side portion S.

However the protrusions 6p are not limited thereto and a plurality of short protrusions 6p may be disposed in the tire radial direction (not illustrated). The short protrusions 6p of such a configuration may overlap with one another in the tire radial direction or may be distanced from one another in the tire radial direction (not illustrated).

Effect

As described above, the vehicle 1 is provided with the wheels 2 fitted with the pneumatic tires 10, and the vehicle body 3 including the wheel wells 31 that surround the wheels 2 (see FIGS. 1 to 3). The pneumatic tire 10 includes the plurality of protrusions 6p on the sidewall portion that faces the predetermined wheel well side surface 311 (see FIGS. 4 to 6). The average normal vector V of the wheel well side surface 311 is inclined with respect to the rotation axis O of the wheel 2 (see FIG. 7 and FIG. 8).

In such a configuration, when the vehicle is traveling and the tires are rotating, an air flow promotion effect and rectification effect are produced due to the protrusions 6p, and negative pressure forms between the tire and the wheel well side surface 311. As a result of this negative pressure, the vehicle body 3 is pulled in the direction of the average normal vector V of the wheel well side surface 311. When the vehicle body 3 is pulled as such, because the average normal vector V is inclined with respect to the rotation axis O of the wheel 2, the vehicle body 3 is subject to additional effects. As a result, driving performance of the vehicle 1 can be improved.

The inner wall of the wheel well 31 of the vehicle 1 continuously surrounds a region of the outer circumference of the pneumatic tire 10 from the rim check line LC on one side to the tire equatorial plane CL, when viewed in a cross section taken along the tire meridian direction (see FIG. 5). The inner wall of the wheel well 31 also continuously surrounds a region of the outer circumference of the pneumatic tire 10 equivalent to 120 degrees in the tire circumferential direction when the sidewall portion is viewed in plan view (see FIG. 4). The wheel well 31 of such a configuration appropriately surrounds the outer circumference of the tire 10, and thus negative pressure can efficiently form between the tire 10 and the wheel well side surface 311.

The average normal vector V of the wheel well side surface 311 of the vehicle 1 is inclined in the road surface direction with respect to the rotation axis O of the wheel 2 (see FIG. 2 and FIG. 7). In such a configuration, the negative pressure between the tire 10 and the wheel well side surface 311 creates downforce on the vehicle body 1. The downforce suppresses lift of the vehicle 1, which in turn reduces the air resistance of the tire or improves the steering stability performance of the tire.

The vehicle 1 has the inclination angle $\theta$ in the road surface direction of the average normal vector V of the wheel well side surface 311 in the range: 3 degrees $\leq \theta \leq 45$ degrees (see FIG. 7). This configuration appropriately suppresses lift of the vehicle 1.

The average normal vector V of the wheel well side surface 311 of the vehicle 1 is inclined in the vehicle forward direction with respect to the rotation axis O of the wheel 2 (see FIG. 3 and FIG. 8). In such a configuration, the negative pressure between the tire 10 and the wheel well side surface 311 causes the vehicle body 3 to be pulled in the forward direction. As a result, for example, the air resistance of the vehicle 1 is reduced.

The vehicle 1 has the inclination angle $\varphi$ in the vehicle forward direction of the average normal vector V of the wheel well side surface 311 in the range: 3 degrees $\leq \Phi \leq 45$ degrees (see FIG. 8). As a result, pulling force pulling the vehicle body 3 in the forward direction is appropriately obtained.

The plurality of protrusions 6p of the vehicle 1 have a long shape in the tire radial direction and are disposed at predetermined intervals in the tire circumferential direction (see FIG. 4). In addition, the height Hp, the width Wp, and the number Np of the protrusions 6p have the relationship: $5 \leq Np \times Hp/Wp \leq 200$. As a result, the relationship among the height Hp, the width Wp, and the number Np of the protrusions 6p is made appropriate, and the air flow promotion effect and the rectification effect due to the protrusions 6p can be effectively obtained.

The wheel well side surface 311 of the vehicle 1 is located inward of the pneumatic tire 10 in the vehicle width direction (see FIG. 2 and FIG. 3). As a result of this configuration of the wheel well side surface 311, negative pressure formed between the tire 10 and the wheel well side surface 311 has a more efficient effect on the vehicle body 3 than a configuration in which the wheel well side surface 311 is located outward of the pneumatic tire 10 in the vehicle width direction (not illustrated).

Additionally, the pneumatic tire 10 of the vehicle 1 includes the plurality of recesses 6d on the sidewall portion located outward in the vehicle width direction (see FIG. 9 and FIG. 10). In such a configuration, an air flow promotion effect and rectification effect are produced due to the recesses 6d when the tire is rotating, and thus the air resistance of the vehicle 1 is reduced.

The depth Hd, the size Wd, and the number Nd of the recesses 6d of the vehicle 1 have the relationship: 5≤Nd× Hd/Wd≤100000. As a result, an air flow promotion effect and rectification effect due to the recesses 6d are effectively obtained.

EXAMPLES

Figure 16:
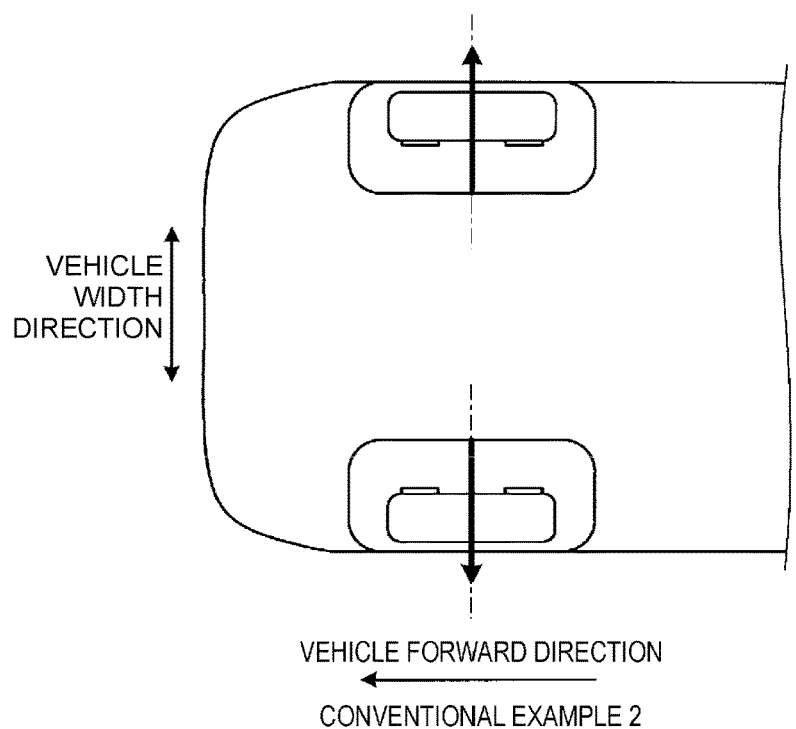
FIG. 16 is an explanatory view illustrating a vehicle of Conventional Example 2.
Figure 17:
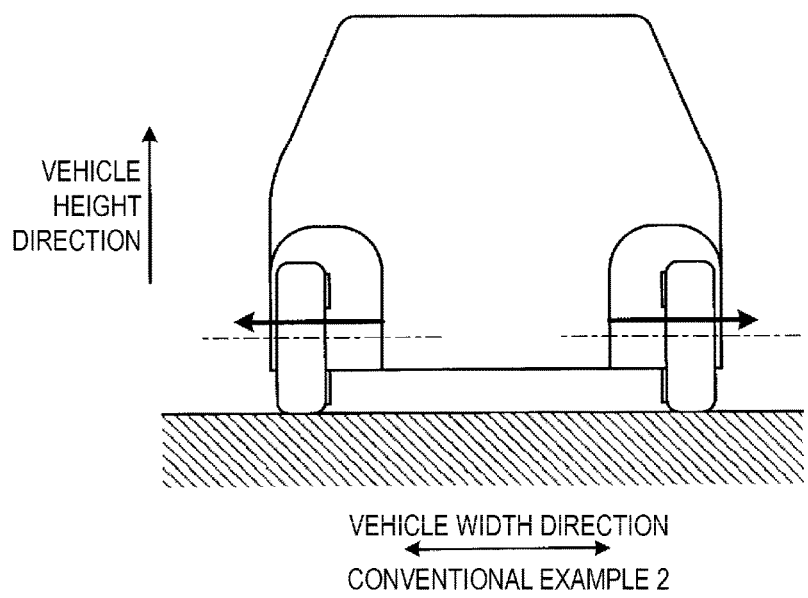
FIG. 17 is an explanatory view illustrating the vehicle of Conventional Example 2.

FIG. 15 is a table showing results of performance testing of pneumatic tires according to embodiments of the present technology. FIGS. 16 and 17 are explanatory views illustrating a vehicle of Conventional Example 2.

The performance testing involved carrying out simulation testing to test (1) air resistance and (2) lift of a vehicle. A variety of different vehicle models were used in the simulation testing. The various vehicle models each constituted of a body model of a motor-assisted passenger vehicle having a tire model with a tire size of 195/65R15 mounted thereto were used in the simulation testing. Using fluid dynamics analysis software based on the lattice Boltzmann method, the aerodynamic drag and lift of the vehicle model when traveling at a speed of 80 km/h was obtained. On the basis of the results of the analysis, index evaluation was conducted using Conventional Example 1 as a reference. Low values in the evaluation indicate low air resistance and lift (preferred result).

The vehicle models of Working Examples 1 to 9 had a configuration in which the inner wall of the wheel well 31 was located inward of the wheel 2 in the vehicle width direction and the pneumatic tire 10 had the configuration illustrated in FIGS. 4 to 6. The vehicle models of Working Examples 1 and 2 had the configuration illustrated in FIG. 2 but not the configuration illustrated in FIG. 3. Accordingly, the average normal vector V of the wheel well side surface 311 was only inclined in the road surface direction. The vehicle models of Working Examples 3 and 4 had the configuration illustrated in FIG. 3 but not the configuration illustrated in FIG. 2. Accordingly, the average normal vector V of the wheel well side surface 311 was only inclined in the vehicle forward direction. The vehicle models of the Working Examples 5 to 9 had both of the configurations illustrated in FIG. 2 and FIG. 3. Accordingly, the average normal vector V of the wheel well side surface 311 was inclined in the road surface direction and in the vehicle forward direction. The pneumatic tire 10 of the vehicle model of Working Example 10 had the configuration illustrated in FIG. 9 and FIG. 10 and included recesses 6d on the sidewall portion located outward in the vehicle width direction.

The pneumatic tire of the vehicle model of Conventional Example 1 was without protrusions and recesses on the sidewall portion, and the average normal vector of the wheel well side surface was parallel to the rotation axis of the wheel. The pneumatic tire of the vehicle model of Conventional Example 2 had the configuration illustrated in FIGS. 4 to 6, but the average normal vector of the wheel well side surface was parallel to the rotation axis of the wheel.

The results of the simulation make it clear that the vehicle models of Working Examples 1 to 10 had reduced air resistance of the vehicle 1 and suppressed lift due to the average normal vector V of the wheel well side surface 311 being inclined with respect to the rotation axis O of the wheel 2.

The invention claimed is:

1. A vehicle comprising:
a wheel fitted with a pneumatic tire; and
a vehicle body including a wheel well that surrounds the wheel; wherein
the pneumatic tire includes a plurality of protrusions on a sidewall portion that faces a wheel well side surface, the wheel well side surface corresponding to a portion of an inner wall of the wheel well located within a region the pneumatic tire is projected in a rotation axis direction of the wheel when a steering angle and a camber angle is 0 degrees; and
an average normal vector of the wheel well side surface is inclined in a vehicle forward direction with respect to the rotation axis of the wheel.

2. The vehicle according to claim 1, wherein
the inner wall of the wheel well continuously surrounds at least:
a region of an outer circumference of the pneumatic tire from a rim check line on one side to a tire equatorial plane, when viewed in a cross section taken along a tire meridian direction, and
a region of the outer circumference of the pneumatic tire equivalent to 120 degrees in a tire circumferential direction when the sidewall portion is viewed in plan view.

3. The vehicle according to claim 2, wherein
the average normal vector of the wheel well side surface is inclined in a road surface direction with respect to the rotation axis of the wheel.

4. The vehicle according to claim 3, wherein
the average normal vector of the wheel well side surface has an inclination angle in the road surface direction in a range of from not less than 3 degrees to not greater than 45 degrees.

5. The vehicle according to claim 4, wherein
the average normal vector of the wheel well side surface has an inclination angle in the vehicle forward direction in a range of from not less than 3 degrees to not greater than 45 degrees.

6. The vehicle according to claim 5, wherein
the plurality of protrusions have a long shape in a tire radial direction and are disposed at predetermined intervals in the tire circumferential direction; and
a height, a width, and a number of the protrusions have a relationship where the number of the protrusions× height/width is in a range of from not less than 5 to not greater than 200.

7. The vehicle according to claim 6, wherein
the wheel well side surface is located inward of the pneumatic tire in a vehicle width direction.

8. The vehicle according to claim 7, wherein
the pneumatic tire includes a plurality of recesses on a sidewall portion located outward in the vehicle width direction.

9. The vehicle according to claim 8, wherein
a depth, a size, and a number of the recesses have a relationship where the number of the recesses×depth/ size is in a range of from not less than 5 to not greater than 100000.

10. The vehicle according to claim 1, wherein
the average normal vector of the wheel well side surface is inclined in a road surface direction with respect to the rotation axis of the wheel.

11. The vehicle according to claim 10, wherein
the average normal vector of the wheel well side surface has an inclination angle in the road surface direction in a range of from not less than 3 degrees to not greater than 45 degrees.

12. The vehicle according to claim 1, wherein
the average normal vector of the wheel well side surface has an inclination angle in the vehicle forward direction in a range of from not less than 3 degrees to not greater than 45 degrees.

13. The vehicle according to claim 1, wherein
the plurality of protrusions have a long shape in a tire radial direction and are disposed at predetermined intervals in a tire circumferential direction; and
a height, a width, and a number of the protrusions have a relationship where the number×height/width is in a range of from not less than 5 to not greater than 200.

14. The vehicle according to claim 1, wherein
the wheel well side surface is located inward of the pneumatic tire in a vehicle width direction.

15. The vehicle according to claim 14, wherein
the pneumatic tire includes a plurality of recesses on a sidewall portion located outward in the vehicle width direction.

16. The vehicle according to claim 15, wherein
a depth, a size, and a number of the recesses have a relationship where the number×depth/size is in a range of from not less than 5 to not greater than 100000.

17. A vehicle comprising:
a wheel fitted with a pneumatic tire; and
a vehicle body including a wheel well that surrounds the wheel; wherein
the pneumatic tire includes a plurality of protrusions on a sidewall portion that faces a wheel well side surface, the wheel well side surface corresponding to a portion of an inner wall of the wheel well located within a region the pneumatic tire is projected in a rotation axis direction of the wheel when a steering angle and a camber angle is 0 degrees;
an average normal vector of the wheel well side surface is inclined with respect to the rotation axis of the wheel;
the wheel well side surface is located inward of the pneumatic tire in a vehicle width direction;
the pneumatic tire includes a plurality of recesses on a sidewall portion located outward in the vehicle width direction; and
a depth, a size, and a number of the recesses have a relationship where the number×depth/size is in a range of from not less than 5 to not greater than 100000.

* * * * *